(12) United States Patent
Sharma et al.

(10) Patent No.: US 9,892,402 B2
(45) Date of Patent: Feb. 13, 2018

(54) FINANCIAL AUTHORIZATION OF AN ONLINE TRANSACTION BASED ON A LOCATION AND AN IDENTIFIER OF A USER DEVICE

(71) Applicant: Verizon Patent and Licensing Inc., Basking Ridge, NJ (US)

(72) Inventors: Manish Sharma, San Jose, CA (US); Kevin Flores, San Jose, CA (US); Devin Blong, Penngrove, CA (US); Tushar Chaudhary, Mountain View, CA (US); Gaurav Gupta, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 386 days.

(21) Appl. No.: 14/132,870

(22) Filed: Dec. 18, 2013

(65) Prior Publication Data

US 2015/0170149 A1 Jun. 18, 2015

(51) Int. Cl.
   *G06Q 20/00* (2012.01)
   *G06Q 20/32* (2012.01)
   *G06Q 20/02* (2012.01)
   *G06Q 20/12* (2012.01)
   *G06Q 20/38* (2012.01)

(52) U.S. Cl.
   CPC ....... *G06Q 20/3224* (2013.01); *G06Q 20/027* (2013.01); *G06Q 20/12* (2013.01); *G06Q 20/385* (2013.01)

(58) Field of Classification Search
   None
   See application file for complete search history.

(56) References Cited

U.S. PATENT DOCUMENTS

| 5,311,594 | A | * | 5/1994 | Penzias | G06Q 20/04 |
| | | | | | 379/189 |
| 5,745,654 | A | * | 4/1998 | Titan | G06N 3/105 |
| | | | | | 706/11 |
| 6,046,689 | A | * | 4/2000 | Newman | G08G 1/123 |
| | | | | | 340/988 |
| 6,163,771 | A | * | 12/2000 | Walker | G06Q 20/04 |
| | | | | | 705/18 |

(Continued)

OTHER PUBLICATIONS

Graphs.net, "Process of Making a Credit Card Payment Online", http://graphs.net/201208/making-a-credit-card-payment-online.html, Aug. 28, 2012, 4 pages.

(Continued)

*Primary Examiner* — Rajesh Khattar

(57) ABSTRACT

A processor server receives transaction information associated with an online transaction between a user device and a merchant server, and provides embedded code to the user device based on receiving the transaction information. The processor server receives, based on execution of the embedded code, location information identifying a geographic location at which the user device is located, and an identifier associated with the user device. The processor server determines an authorization decision for the online transaction based on the transaction information, the location information, and the identifier, and forwards the authorization decision to the merchant server to permit the merchant server to approve or deny the online transaction.

20 Claims, 11 Drawing Sheets

(56) References Cited

U.S. PATENT DOCUMENTS

| | | | | |
|---|---|---|---|---|
| 8,020,763 B1* | 9/2011 | Kowalchyk | G06Q 20/102 | 235/380 |
| 8,630,953 B1* | 1/2014 | Youngberg | G06Q 20/4016 | 705/35 |
| 2003/0069820 A1* | 4/2003 | Hillmer | G06Q 20/206 | 705/35 |
| 2006/0224508 A1* | 10/2006 | Fietz | G06Q 20/10 | 705/40 |
| 2008/0005037 A1* | 1/2008 | Hammad | G06Q 20/085 | 705/67 |
| 2008/0222038 A1* | 9/2008 | Eden | G06Q 20/04 | 705/44 |
| 2009/0327134 A1* | 12/2009 | Carlson | G06Q 20/04 | 705/44 |
| 2010/0186066 A1* | 7/2010 | Pollard | G06Q 20/40 | 726/3 |
| 2011/0010235 A1* | 1/2011 | Kenny | G06Q 30/02 | 705/14.23 |
| 2012/0158585 A1* | 6/2012 | Ganti | G06Q 20/4016 | 705/44 |
| 2012/0173429 A1* | 7/2012 | Stevens | G06Q 20/32 | 705/44 |
| 2013/0117081 A1* | 5/2013 | Wilkins | G06Q 30/0248 | 705/14.4 |
| 2013/0179346 A1* | 7/2013 | Kumnick | G06Q 20/40145 | 705/44 |
| 2013/0226799 A1* | 8/2013 | Raj | G07C 9/00 | 705/44 |
| 2014/0214671 A1* | 7/2014 | Desilva | G06Q 20/383 | 705/44 |
| 2015/0004935 A1* | 1/2015 | Fu | H04W 12/08 | 455/411 |

OTHER PUBLICATIONS

Visa, "Card-Not-Present," https://web.archive.org/web/20131201132609/http:/usa.visa.com/merchants/risk_management/card_not_present.html, Dec. 1, 2013, 2 pages.

* cited by examiner

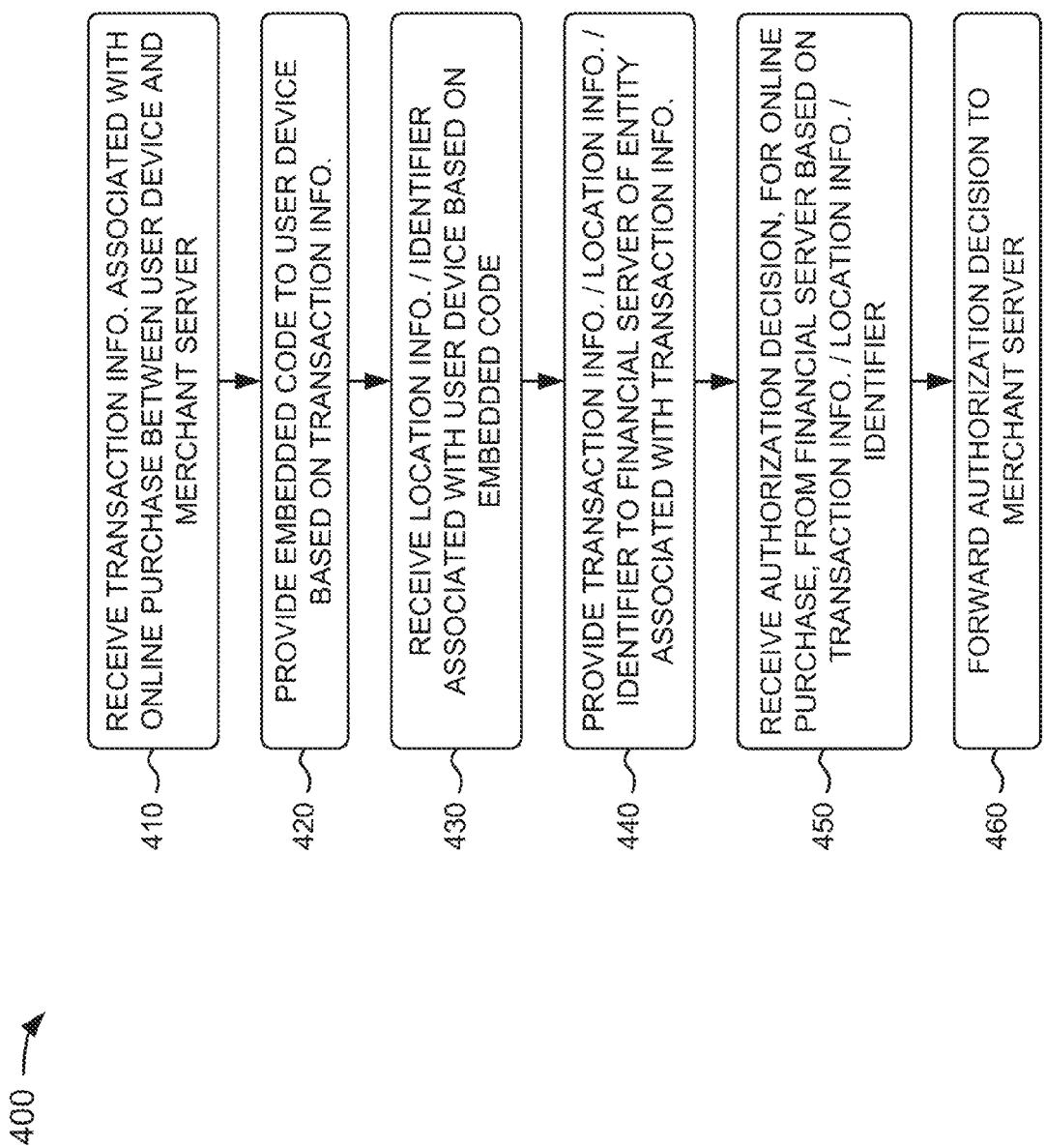

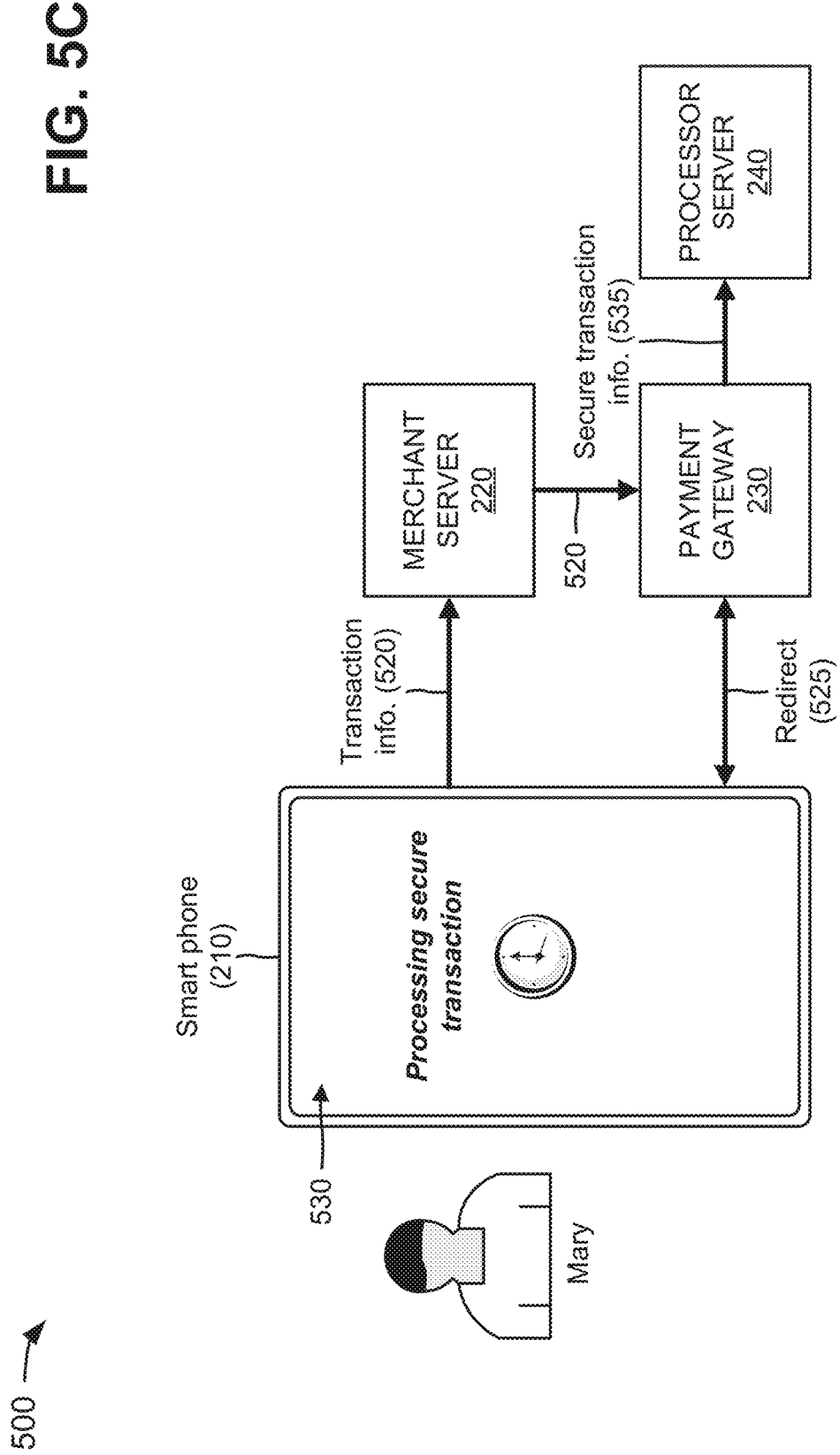

FINANCIAL AUTHORIZATION OF AN ONLINE TRANSACTION BASED ON A LOCATION AND AN IDENTIFIER OF A USER DEVICE

BACKGROUND

A user may utilize a device (e.g., a smart phone, a laptop computer, etc.) to access content (e.g., a web site) and perform an online purchase of products and/or services provided by a merchant. Financial fraud is a major problem associated with online purchases. For example, online merchants are losing a significant amount of revenue to financial fraud every year. Accordingly, financial entities (e.g., credit card networks, banks, etc.) have developed some methods that attempt to identify fraudulent online purchases. For example, financial entities have identified the following financial fraud indicators: a first-time shopper, larger-than-normal orders; orders that include several of the same item; orders made up of big-ticket items; rush or overnight shipping; shipping to an international address; transactions with similar account numbers; shipping to a single address, but transactions placed on multiple cards; multiple transactions on one card over a very short period of time; etc.

BRIEF DESCRIPTION OF THE DRAWINGS

FIG. 4 is a flow chart of an example process for providing financial authorization of an online transaction based on a geographic location and an identifier associated with a user device; and FIGS. 5A-5G are diagrams of an example relating to the example process shown in FIG. 4.

DETAILED DESCRIPTION OF PREFERRED EMBODIMENTS

The following detailed description refers to the accompanying drawings. The same reference numbers in different drawings may identify the same or similar elements.

Figure 1:
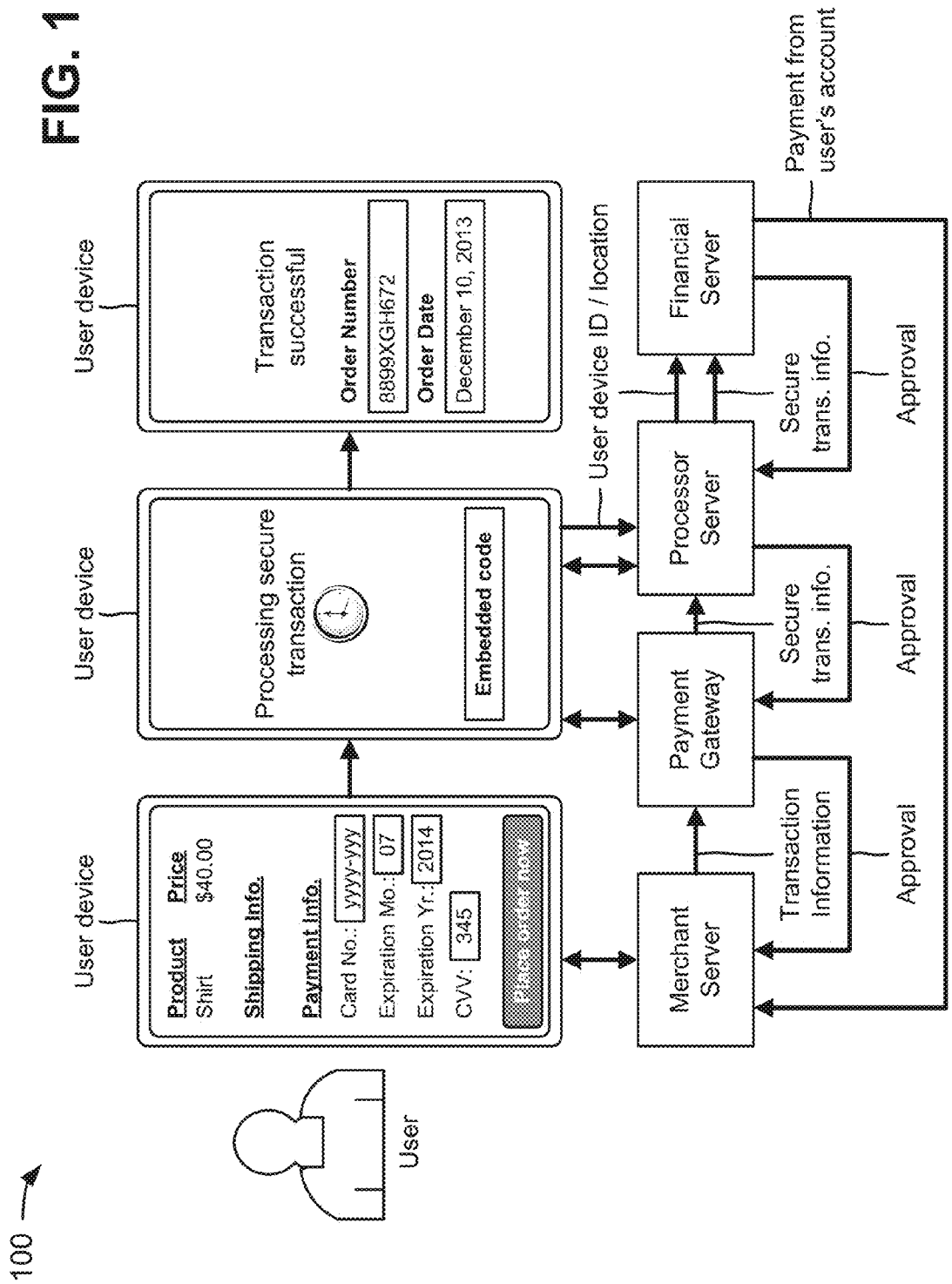
FIG. 1 is a diagram of an overview of an example implementation described herein.

FIG. 1 is a diagram of an overview of an example implementation 100 described herein. As shown in FIG. 1, assume that a user is associated with a user device, and that the user utilizes the user device to make an online purchase (e.g., of a shirt) from a merchant associated with a merchant server. Further, assume that the user utilizes the user device to input shipping information and payment information for the online purchase. The payment information may include, for example, a credit card number (e.g., "yyyy-yyy"), an expiration month (e.g., "07") of the credit card, an expiration year (e.g., "2014") of the credit card, and a card verification value (CVV) (e.g., "345") of the credit card. The user may select a "Place order now" button in order to instruct the user device to provide transaction information, associated with the online purchase, to the merchant server. The transaction information may include, for example, information associated with the purchased item(s) (e.g., a description and a price for the shirt), the shipping information, and the payment information.

As further shown in FIG. 1, the merchant server may provide the transaction information to a payment gateway. When the payment gateway receives the transaction information, the user device may be redirected from the merchant server to the payment gateway, without the knowledge of the user. The payment gateway may securely provide the transaction information (e.g., as secure transaction information) to a processor server. When the processor server receives the transaction information, the user device may be redirected from the payment gateway to the processor server, without the knowledge of the user. For example, as shown in FIG. 1, when the user device is redirected to the payment gateway and/or the processor server, the user device may display information indicating that the transaction is being securely processed.

In some implementations, when the user device is redirected to the processor server, the processor server may temporarily provide embedded code to the user device. The embedded code may cause the user device to provide, to the processor server, information identifying a geographic location of the user device and an identifier (ID) of the user device. The processor server may provide the secure transaction information, the user device location information, and the user device ID to a financial server associated with a financial institution. The financial institution may be associated with the provider of the credit card identified by the user in the online purchase. The financial server may approve or decline the online purchase based on the transaction information, the user device location information, and/or the user device ID.

For example, the financial server may decline the online purchase if the geographic location of the user device indicates that the user device is located in a state that is geographically different than a state associated with the credit card. In another example, the financial server may decline the online purchase if the user device ID does not match identifier(s) of user device(s) determined to be associated with the credit card.

In example implementation 100, assume that the transaction information, the user device location information, and the user ID match information associated with the credit card, and that, accordingly, the financial server approves the online purchase. The financial server may provide an approval indication to the processor server, and the processor server may forward the approval indication to the merchant server, via the payment gateway. When the approval indication is generated, the user device may be redirected back to the merchant server, and the merchant server may provide, to the user device, information indicating that the transaction is successful (e.g., along with an order number and an order date). The user device may display the successful transaction information to the user. As further show in FIG. 1, when the approval indication is generated, the financial server may provide payment, for the online purchase, from the user's credit card account to the merchant server.

Systems and/or methods described herein may use a geographic location and an identifier, associated with a user device, to provide an additional layer of security for financial authorization of online transactions. The user device location and identifier may be used to identify fraudulent online transactions in addition to the other methods that attempt to identify fraudulent online transactions. The systems and/or methods may be described in terms of credit card transactions, but may be utilized with other types of financial transactions (e.g., transactions of a payment service provider, such as PayPal, Google Wallet, Amazon Payments, etc.).

Content, as used herein, is to be broadly interpreted to include a web site, a web page, an application, a video, audio, an image, text, a software download, and/or a combination of a web site, a web page, an application, a video, audio, an image, text, and/or a software download.

A product, as the term is used herein, is to be broadly interpreted to include anything that may be marketed or sold as a commodity or a good. For example, a product may include clothing, bread, coffee, bottled water, milk, soft drinks, pet food, beer, fuel, meat, fruit, automobiles, clothing, etc.

A service, as the term is used herein, is to be broadly interpreted to include any act or variety of work done for others (e.g., for compensation). For example, a service may include a repair service (e.g., for a product), a warranty service (e.g., for a product), a communication service (e.g., a telephone service, an Internet service, a network service, a radio service, a television service, a video service, etc.), an automobile service (e.g., for selling automobiles), a food service (e.g., for a restaurant), a banking service, a lodging service (e.g., for a hotel), etc.

Figure 2:
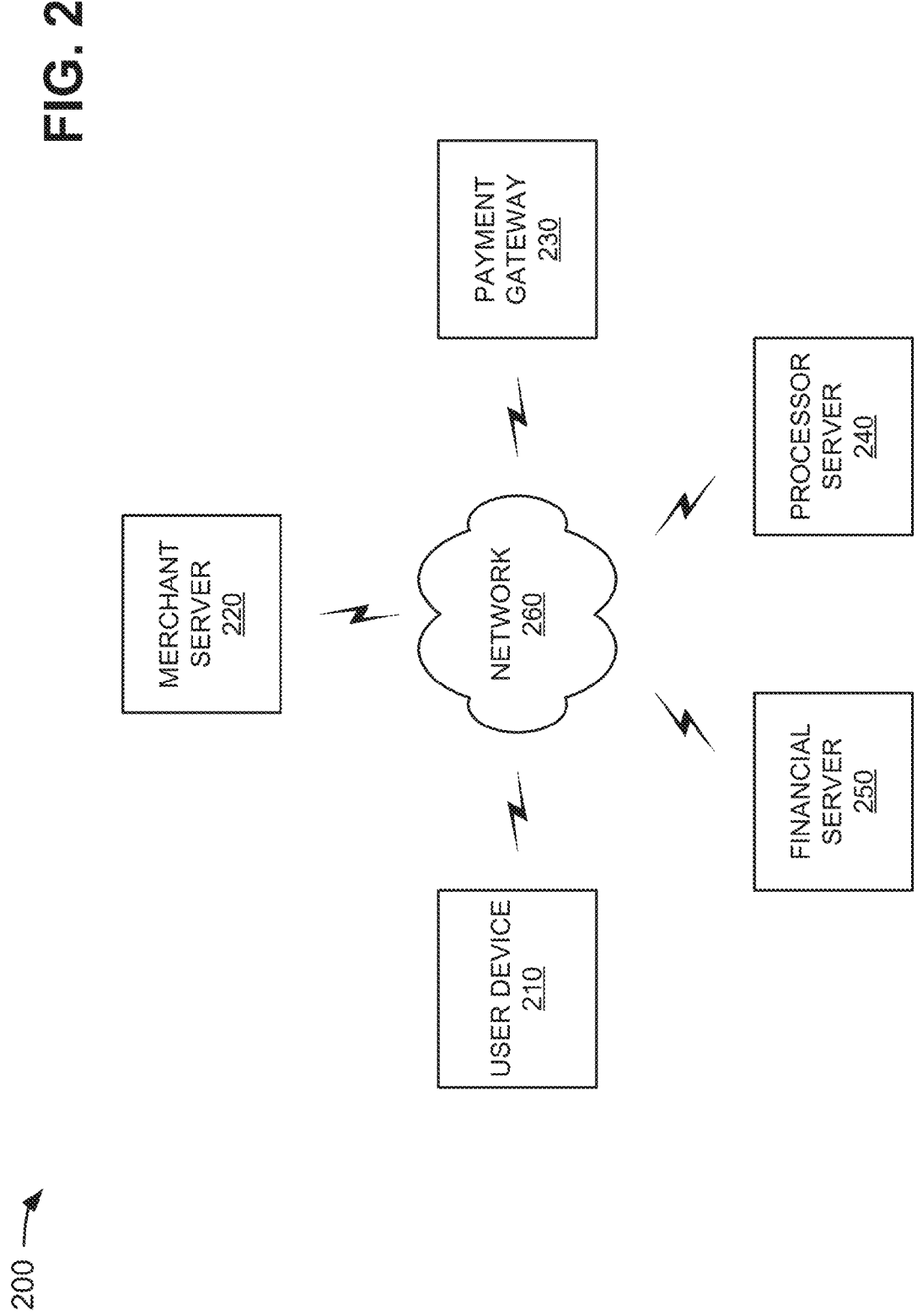
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, a merchant server 220, a payment gateway 230, a processor server 240, a financial server 250, and a network 260. Devices/networks of environment 200 may interconnect via wired connections, wireless connections, or a combination of wired and wireless connections.

User device 210 may include a device that is capable of communicating over network 260 with merchant server 220, payment gateway 230, processor server 240, and/or financial server 250. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Merchant server 220 may include one or more personal computers, workstation computers, server devices, or other types of computation and communication devices. In some implementations, merchant server 220 may provide content to user device 210 (e.g., via a web site and/or an application), and may enable a user of user device 210 to conduct online transactions via the web site and/or the application. In some implementations, merchant server 220 may include information about products, services, and/or content that may be purchased online via merchant server 220. For example, merchant server 220 may sell apparel (e.g., shirts, hats, sweatshirts, shoes, etc.) associated with various apparel manufacturers. In such an example, merchant server 220 may provide information (e.g., images, prices, descriptions, shipping options, etc.) associated with the apparel to user device 210.

Payment gateway 230 may include one or more personal computers, workstation computers, server devices, or other types of computation and communication devices. In some implementations, payment gateway 230 may facilitate financial transactions (e.g., credit card payments, payment service provider (e.g., PayPal) payments, etc.) for online purchases (e.g., from merchant server 220). In some implementations, payment gateway 230 may protect financial information by encrypting sensitive information (e.g., credit card numbers) to ensure that the financial information is passed securely between user device 210 and merchant server 220 and also between merchant server 220 and processor server 240. In some implementations, payment gateway 230 may facilitate the transfer of information between a payment portal (e.g., a web site provided by merchant server 220 to user device 210) and processor server 240 or financial server 250.

Processor server 240 may include one or more personal computers, workstation computers, server devices, or other types of computation and communication devices. In some implementations, processor server 240 may be associated with an entity (e.g., a third party) appointed by a merchant (e.g., associated with merchant server 220) to handle financial transactions for the merchant. In some implementations, processor server 240 may receive secure transaction information from payment gateway 230, and may forward the secure transaction information to financial server 250 for an authorization decision (e.g., an approval or a denial). In some implementations, processor server 240 may temporarily provide embedded code (e.g., an application, a code snippet, a script, a widget, etc.) to user device 210 when processor server 240 receives the secure transaction information from payment gateway 230. The embedded code may cause user device 210 to provide location information (e.g., a global positioning system (GPS) location, a cell location, latitude and longitude coordinates, etc.) associated with user device 210 to processor server 240. The embedded code may also cause user device 210 to provide an identifier (e.g., a mobile directory number (MDN), a mobile equipment identifier (MEID), a telephone number, an Internet protocol (IP) address, etc.) associated with user device 210 to processor server 240. Processor server 240 may forward the location information and the identifier, associated with user device 210, to financial server 250.

Financial server 250 may include one or more personal computers, workstation computers, server devices, or other types of computation and communication devices. In some implementations, financial server 250 may be associated with an entity (e.g., a financial institution, such as a credit card bank, a credit card network, etc.) that verifies the secure transaction information, the location information of user device 210, and/or the identifier of user device 210 received from processor server 240. In some implementations, financial server 250 may approve or decline the transaction based on the transaction information, the location information of user device 210, and/or the identifier of user device 210. In some implementations, if financial server 250 approves the transaction, financial server 250 may provide an approval message to merchant server 220, via processor server 240 and payment gateway 230, and may transfer funds from the user's account to merchant server 220 for the transaction. In some implementations, if financial server 250 declines the transaction, financial server 250 may provide a decline or denial message to merchant server 220, via processor server 240 and payment gateway 230, and merchant server 220 may decline the transaction.

Network 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
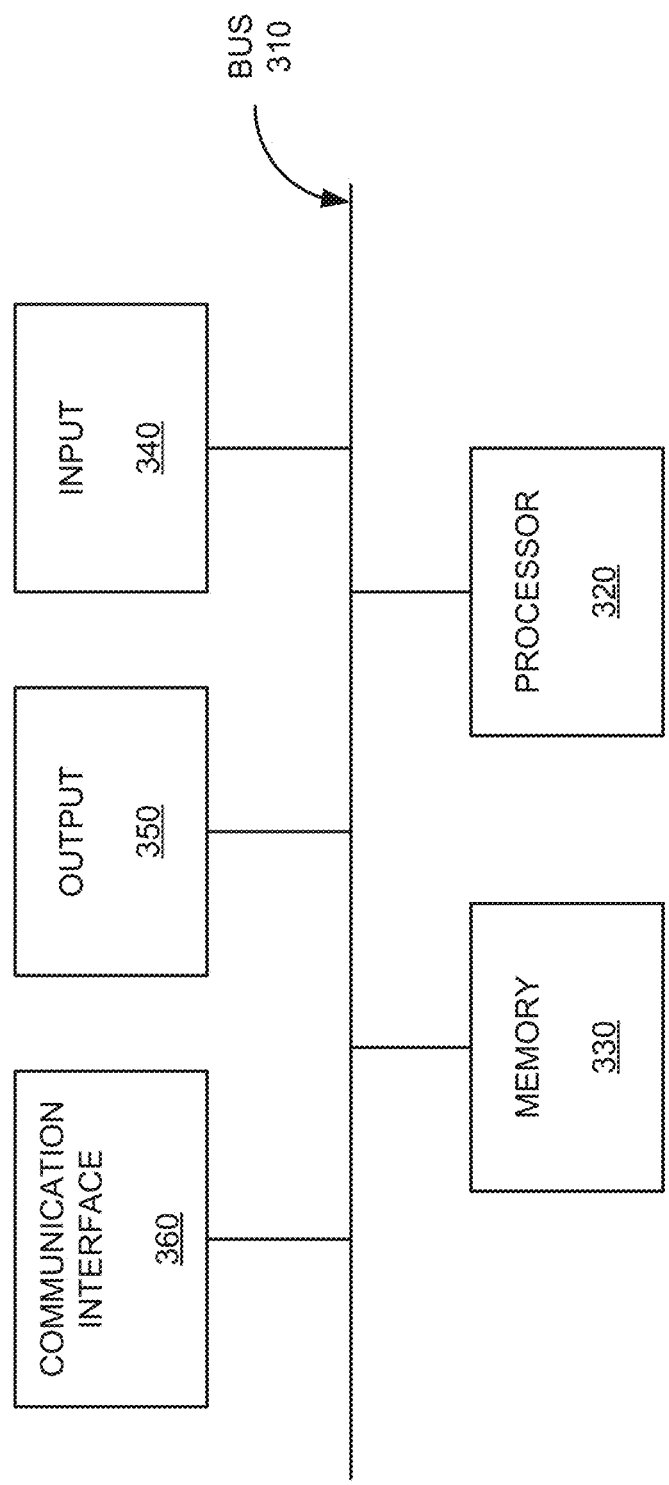
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for providing financial authorization of an online transaction based on a geographic location and an identifier associated with a user device. In some implementations, one or more process blocks of FIG. 4 may be performed by processor server 240. In some implementations, one or more process blocks of FIG. 4 may be performed by another device or a group of devices separate from or including processor server 240.

As shown in FIG. 4, process 400 may include receiving transaction information associated with an online purchase between a user device and a merchant server (block 410). For example, a user may utilize user device 210 to access content provided by merchant server 220. In some implementations, user device 210 may access a web site, a web page, an application, etc. that includes content provided by merchant server 220, and may display the content to the user. For example, the user may provide, to user device 210, an address (e.g., a uniform resource locator (URL)) associated with a web page provided by merchant server 220, and user device 210 may access the content via the web page and based on the address. In some implementations, the content may identify products, services, and/or content that may be purchased by the user from the merchant associated with merchant server 220. For example, the user may perform an online purchase transaction by selecting one or more products (e.g., shoes) offered by the merchant. The user may also provide shipping information and payment information for the online purchase via user device 210. The shipping information may include a physical address to which to ship the product(s), such as a street address, a city, a state, and a zip code associated with the user's home or business. The payment information may include a billing address of the user (e.g., which may be the same as the shipping address), credit card information (e.g., a credit number, an expiration month, an expiration year, etc.), and/or information (e.g., a username and password) associated with a payment service provider (e.g., PayPal, Google Wallet, Amazon Payments, etc.).

In some implementations, merchant server 220 may receive information associated with the selected products, the shipping information, and the payment information (e.g., referred to herein as transaction information), and may forward the transaction information to payment gateway 230. Payment gateway 230 may receive the transaction information, and may encrypt the transaction information to create secure transaction information. In some implementations, payment gateway may share encryption mechanisms (e.g., encryption keys) with processor server 240 and/or financial server 250 so that processor server 240 and/or financial server 250 may decrypt the secure transaction information. Payment gateway 230 may provide the secure transaction information to processor server 240, and processor server 240 may receive the secure transaction information. In some implementations, processor server 240 may decrypt the secure transaction information.

As further shown in FIG. 4, process 400 may include providing embedded code to the user device based on the transaction information (block 420). For example, when processor server 240 receives the secure transaction information, user device 210 may be redirected from merchant server 220 (e.g., the web page provided by merchant server 220) to processor server 240. In some implementations, merchant server 220 may redirect user device 210 to payment gateway 230, and payment gateway 230 may redirect user device 210 to processor server 240. For example, merchant server 220 may provide an address (e.g., an IP address) associated with payment gateway 230 to user device 210, and user device 210 may be redirected to payment gateway 230 based on the address of payment gateway 230. Payment gateway 230 may provide an address (e.g., an IP address) associated with processor server 240 to user device 210, and user device 210 may be redirected to processor server 240 based on the address of processor server 240.

In some implementations, when user device 210 is redirected to payment gateway 230 and/or processor server 240, user device 210 may terminate communication with merchant server 220 and establish a new communication with payment gateway 230 and/or processor server 240. In some implementations, when user device 210 is redirected to payment gateway 230 and/or processor server 240, user device 210 may maintain the communication with merchant server 220 while establishing the new communication with payment gateway 230 and/or processor server 240. In some implementations, the user may be unaware that user device 210 is redirected to processor server 240 since user device 210 may continue to display the merchant's web page to the user. In some implementations, when user device 210 is redirected to processor server 240, merchant server 220 or processor server 240 may provide to user device 210 a web page indicating that the transaction is being processed.

When user device 210 is redirected to processor server 240, processor server 240 may be able to communicate with user device 210, and may temporarily provide embedded code to user device 210 (e.g., with or without the user's approval). In some implementations, the embedded code may include an application, a code snippet, a script, a widget, etc. that, when executed by user device 210 or processor server 240, causes user device 210 to determine location information (e.g., a GPS location, a cell location, latitude and longitude coordinates, etc.) and an identifier (e.g., a MDN, a MEID, a telephone number, an IP address, etc.) associated with user device 210.

As further shown in FIG. 4, process 400 may include receiving location information and an identifier associated with the user device based on the embedded code (block 430). For example, the embedded code may further cause user device 210 to provide the location information and the identifier, associated with user device 210, to processor server 240. In some implementations, processor server 240 may receive the location information and the identifier associated with user device 210. In some implementations, the location information and the identifier may be encrypted so that the location information and the identifier may not be available to merchant server 220. In such implementations, user device 210 may share encryption mechanisms (e.g., encryption keys) with processor server 240 and/or financial server 250 so that processor server 240 and/or financial server 250 may decrypt the encrypted location information and identifier and determine the location information and the identifier.

In some implementations, the embedded code may cause user device 210 to provide, to processor server 240, other information associated with user device 210 and/or the user. For example, the other information may include a model type associated with user device 210, a model number associated with user device 210, a manufacturer of user device 210, information associated with an account of the user (e.g., a telecommunications service account, an Internet service account, etc.).

In some implementations, after the embedded code causes user device 210 to provide the location information, the identifier, and the other information associated with user device 210 to processor sever 240, the embedded code may be removed from user device 210. For example, after the embedded code is executed, the embedded code may cause user device 210 to remove the embedded code from user device 210. In another example, after the embedded code is executed, processor server 240 may instruct user device 210 to remove the embedded code or may remove the embedded code from a web page provided by processor server 240 to user device 210.

As further shown in FIG. 4, process 400 may include providing the transaction information, the location information, and the identifier to a financial server of an entity associated with the transaction information (block 440). For example, processor server 240 may provide the transaction information, the location information of user device 210, and the identifier of user device 210 to financial server 250. Financial server 250 may determine whether to approve or decline (e.g., deny) the transaction (referred to herein as an "authorization decision") based on the transaction information, the location information of user device 210, and the identifier of user device 210.

In some implementations, processor server 240 may process the location information and the identifier of user device 210, on behalf of financial server 250, and may provide results of the processing to financial server 250 along with the transaction information. In such implementations, financial server 250 may process the transaction information and may utilize the results of the processing of the location information and the identifier to help make the authorization decision.

In some implementations, processor server 240 may determine a suspicion score for the transaction based on the location information associated with user device 210. For example, processor server 240 may include or be associated with a data structure (e.g., a database, a table, a list, etc.) that includes location information associated with the user, such as locations that the user frequents (e.g., a home address, a work address, locations a particular distance from the home address or the work address, etc.). The location information provided in the data structure may be generated based on previous geographic locations associated with user device 210, previous geographic locations associated with use of the user's credit card (e.g., at a gas station, a mall, etc.), etc. Processor server 240 may compare the location information of user device 210 with the location information provided in the data structure in order to determine the location suspicion score. For example, if the location information of user device 210 is included in the data structure (e.g., the user is in a previously-frequented location), processor server 240 may assign a low value to the location suspicion score for the transaction. If the location information of user device 210 is not included in the data structure (e.g., the user is not in a previously-frequented location), processor server 240 may assign a higher value to the location suspicion score for the transaction. In some implementations, processor server 240 may generate an area (e.g., a circle) that includes the locations frequented by the user, and may assign a low value to the location suspicion score for the transaction if the location of user device 210 is in the circle.

In some implementations, processor server 240 may determine a suspicion score for the transaction based on the identifier associated with user device 210. For example, processor server 240 may include or be associated with a data structure that includes identifiers of user devices 210 associated the user, such as identifiers of user devices 210 previously utilized by the user to perform online transactions (e.g., identifiers of a home computer, a smart phone, a work computer, etc. of the user). For example, if the identifier of user device 210 is included in the data structure (e.g., the user is using a previously-used user device 210), processor server 240 may assign a low value to the identifier suspicion score for the transaction. If the identifier of user device 210 is not included in the data structure (e.g., the user is not using a previously-used user device 210), processor server 240 may assign a higher value to the identifier suspicion score for the transaction.

In some implementations, processor server 240 may determine an overall suspicion score for the transaction based on the location suspicion score and the identifier suspicion score. For example, processor server 240 may add the location suspicion score and the identifier suspicion score to generate the overall suspicion score for the transaction. In some implementations, processor server 240 may assign weights to the location suspicion score and the identifier suspicion score before calculating the overall suspicion score for the transaction. For example, processor server 240 may assign a greater weight to the identifier suspicion score since an incorrect user device identifier may be more suspicious than a mismatching location of user device 210.

In some implementations, processor server 240 may assign a weight to the location suspicion score based on the identifier suspicion score. For example, processor server 240 may assign a greater weight to the location suspicion score if the identifier suspicion score indicates that the identifier of user device 210 does not match (e.g., the identifier of user device 210 does not match but the user is located at home so the transaction may be alright). In another example, processor server 240 may assign a smaller weight to the location suspicion score if the identifier suspicion score indicates that the identifier of user device 210 does match (e.g., the identifier of user device 210 matches so it may be alright that the user is located ten miles from home).

In some implementations, processor server 240 may provide the location suspicion score, the identifier suspicion score, and/or the overall suspicion score to financial server 250, and financial server 250 may utilize the scores and the transaction information to determine the authorization decision. In some implementations, financial server 250 may calculate the location suspicion score, the identifier suspicion score, and/or the overall suspicion score, instead of processor server 240, based on the location information and the identifier of user device 210.

In some implementations, financial server 250 may determine whether the overall suspicion score is greater than a threshold (e.g., meaning very suspicious) or is not greater than the threshold (e.g., meaning suspicious but not very suspicious). If the overall suspicion score is greater than the threshold, financial server 250 may deny the transaction. If the overall suspicion score is not greater than the threshold, financial server 250 may challenge the user with a secret question or may utilize some other factor to determine whether to approve or deny the transaction. For example, assume that the user is in a location that the user has been before (e.g., has used the credit card for a purchase at a brick and mortar store in the area) and, as a result, the overall suspicion score is not greater than the threshold. In such an example, financial server 250 may deny the transaction, or may challenge the user with a secret question (e.g., "what is your mother's maiden name," "what was the name of your first pet," "what was your first car," etc.) and base the approval or the denial on whether the user can answer the question. In another example, assume that the location information of user device 210 matches the user's home address but that the identifier of user device 210 does not match. In such an example, processor server 240 may generate an overall suspicion score that is around the threshold. However, since the user's home address is matched, financial server 250 may provide a challenge question to verify that it is the user.

In some implementations, financial server 250 may include or be associated with a data structure that includes names, physical addresses, card numbers, expiration information, card verification values, and/or other information associated with credit cards issued by an entity associated with financial server 250. Financial server 250 may compare the transaction information with the information provided in the data structure in order to determine whether to approve or decline the transaction. In some implementations, if the transaction information includes a name, an address, a card number, an expiration date, and a card verification value provided in the data structure, financial server 250 may identify a particular credit card provided in the data structure. Financial server 250 may then determine whether to approve, deny, or challenge the transaction for the particular credit card based on the overall suspicion score, the location suspicion score, the identifier suspicion score, and/or other methods used to identify fraudulent online purchases (e.g., orders made up of big-ticket items, rush or overnight shipping, etc.).

As further shown in FIG. 4, process 400 may include receiving an authorization decision, for the online purchase, from the financial server based on the transaction information, the location information, and the identifier (block 450). For example, financial server 250 may provide an authorization decision, for the transaction, to processor server 240, and processor server 240 may receive the authorization decision. In some implementations, financial server 250 may determine the authorization decision based on the transaction information, the location information of user device 210, the identifier of user device 210, the overall suspicion score, the location suspicion score, and/or the identifier suspicion score, as described above. In some implementations, the authorization decision may include a denial of the transaction or an approval of the transaction.

As further shown in FIG. 4, process 400 may include forwarding the authorization decision to the merchant server (block 460). For example, processor server 240 may provide the authorization decision to payment gateway 230, and payment gateway 230 may forward the authorization decision to merchant server 220. In some implementations, if the authorization decision includes an approval of the transaction, financial server 250 may provide an approval message to processor server 240, and processor server 240 may forward the approval message to merchant server 220 via payment gateway 230. In such implementations, financial server 250 may transfer funds for the transaction from an account, associated with the user (e.g., for the credit card), to an entity associated with merchant server 220. Merchant server 220 may generate an order number for the transaction, and may further process the transaction so that the user may receive the products in the future.

In some implementations, if the authorization decision includes a denial of the transaction, financial server 250 may provide a denial message to processor server 240, and processor server 240 may forward the denial message to merchant server 220 via payment gateway 230. In such implementations, merchant server 220 may decline the transaction based on the denial message, and may provide an indication of the denial to user device 210. User device 210 may display the indication to the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
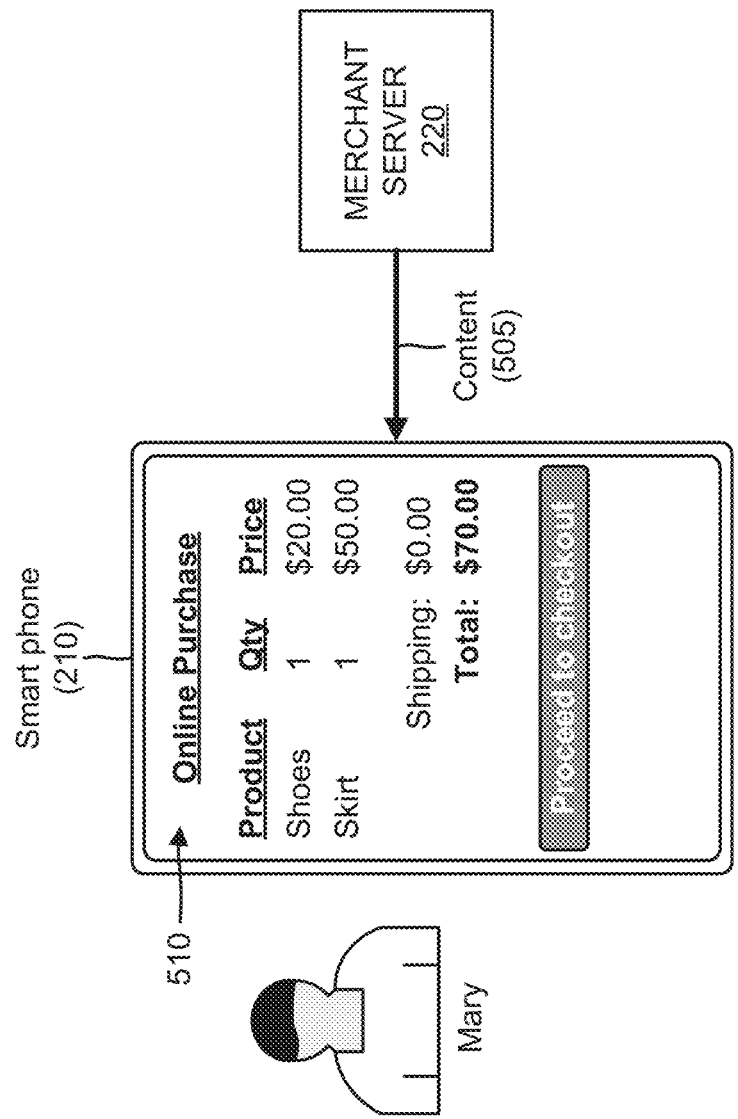

FIGS. 5A-5G are diagrams of an example 500 relating to example process 400 shown in FIG. 4. In example 500, assume that Mary is associated with a user device 210 (e.g., a smart phone 210), as shown in FIG. 5A. Further, assume that Mary utilizes smart phone 210, while in Fairfax Va., to access content 505 provided by merchant server 220. For example, Mary may access a web page 710 of merchant server 220, and smart phone 210 may display web page 710 to Mary. As further shown in FIG. 5A, assume that web page 710 enables Mary to shop for apparel online, and that Mary selects a pair of shoes and skirt to purchase from web page 710. Web page 710 may display the selected items (e.g., the shoes and the skirt), a quantity of the selected items (e.g., one of each), and prices for the selected items (e.g., $20.00 for the shoes and $50.00 for the skirt). Web page 710 may also display a "Proceed to checkout" button that, when selected, may cause merchant server 220 to process the online purchase of Mary.

Figure 5B:
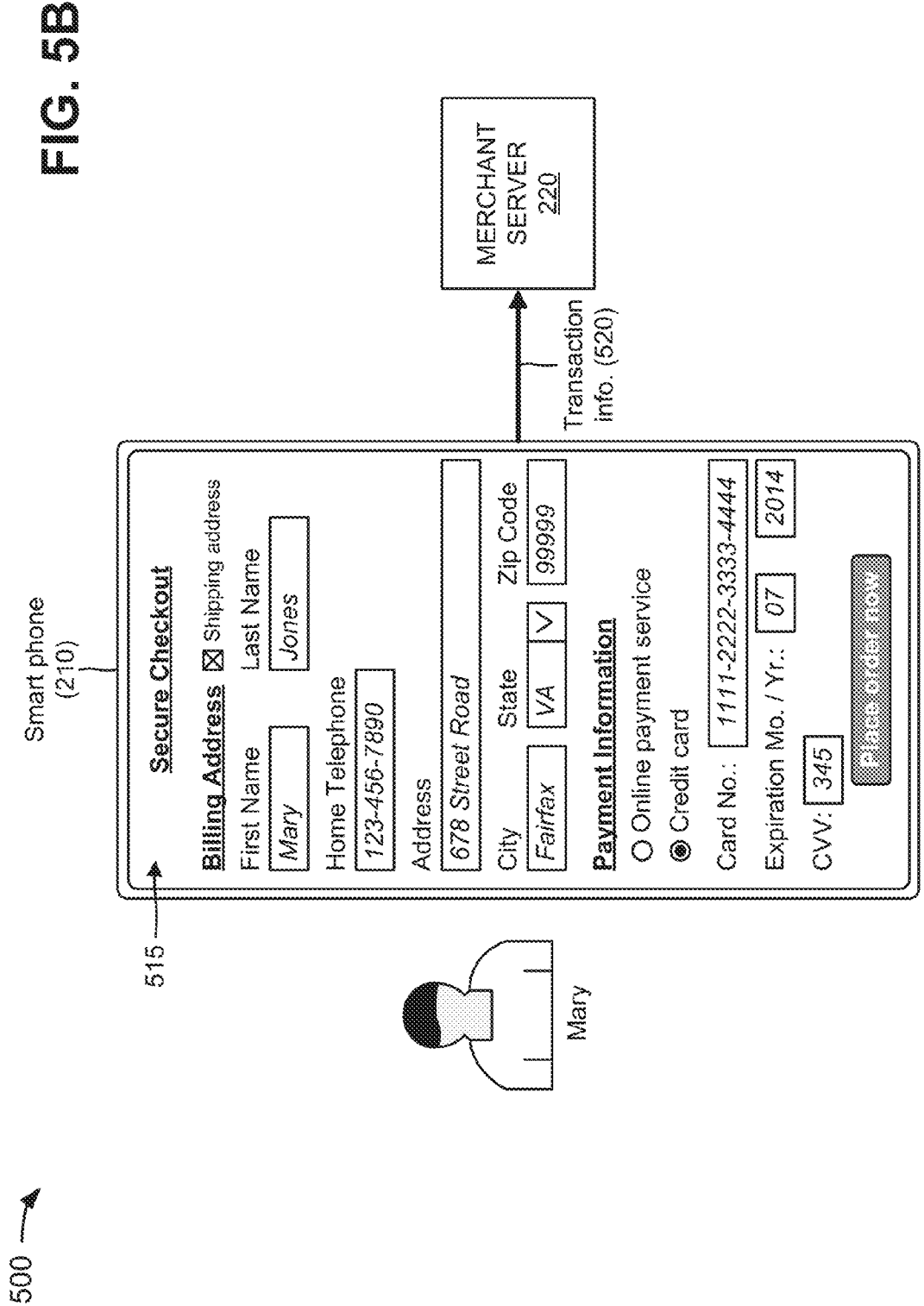

Mary may select the "Proceed to checkout" button, and merchant server 220 may provide another web page 515 to smart phone 210, and smart phone 210 may display web page 515 to Mary, as shown in FIG. 5B. Web page 515 may request information associated with further processing (e.g., a secure checkout) of the online purchase. For example, web page 515 may request, and Mary may provide via smart phone 210, a billing address associated with Mary, and payment information associated with Mary. As shown in FIG. 5B, Mary may provide her first name (e.g., "Mary"), her last name (e.g., "Jones"), her home telephone number (e.g., "123-456-7890"), her street address (e.g., "678 Street Road"), her city (e.g., "Fairfax"), her state (e.g., "Virginia"), and her zip code (e.g., "99999") in the billing section of web page 515. As further shown, Mary may provide her credit card number (e.g., "1111-2222-3333-4444"), an expiration month and year of her credit card (e.g., "07" and "2014"), and a card verification value (CVV) of her credit card (e.g., "345") in the payment information section of web page 515. After Mary provides the information requested by web page 515, assume that Mary selects a "Place order now" button. Selection of the "Place order now" button may cause smart phone 210 to provide the information, as transaction information 520, to merchant server 220.

After smart phone 210 provides transaction information 520 to merchant server 220, smart phone 210 may be redirected to payment gateway 230 from merchant server 220 (e.g., without Mary's knowledge), as indicated by reference number 525 in FIG. 5C. In some implementations, merchant server 220 may continue to display web page 515 to Mary, or merchant server 220 or payment gateway 230 may provide another web page 530 to smart phone 210. Smart phone 210 may display web page 530 to Mary. Web page 530 may include information indicating that Mary's transaction is being securely processed. As further shown in FIG. 5C, merchant server 220 may provide transaction information 520 to payment gateway 230, and payment gateway 230 may encrypt transaction information 520 to create secure transaction information 535. Payment gateway 230 may provide secure transaction information 535 to processor server 240.

Figure 5D:
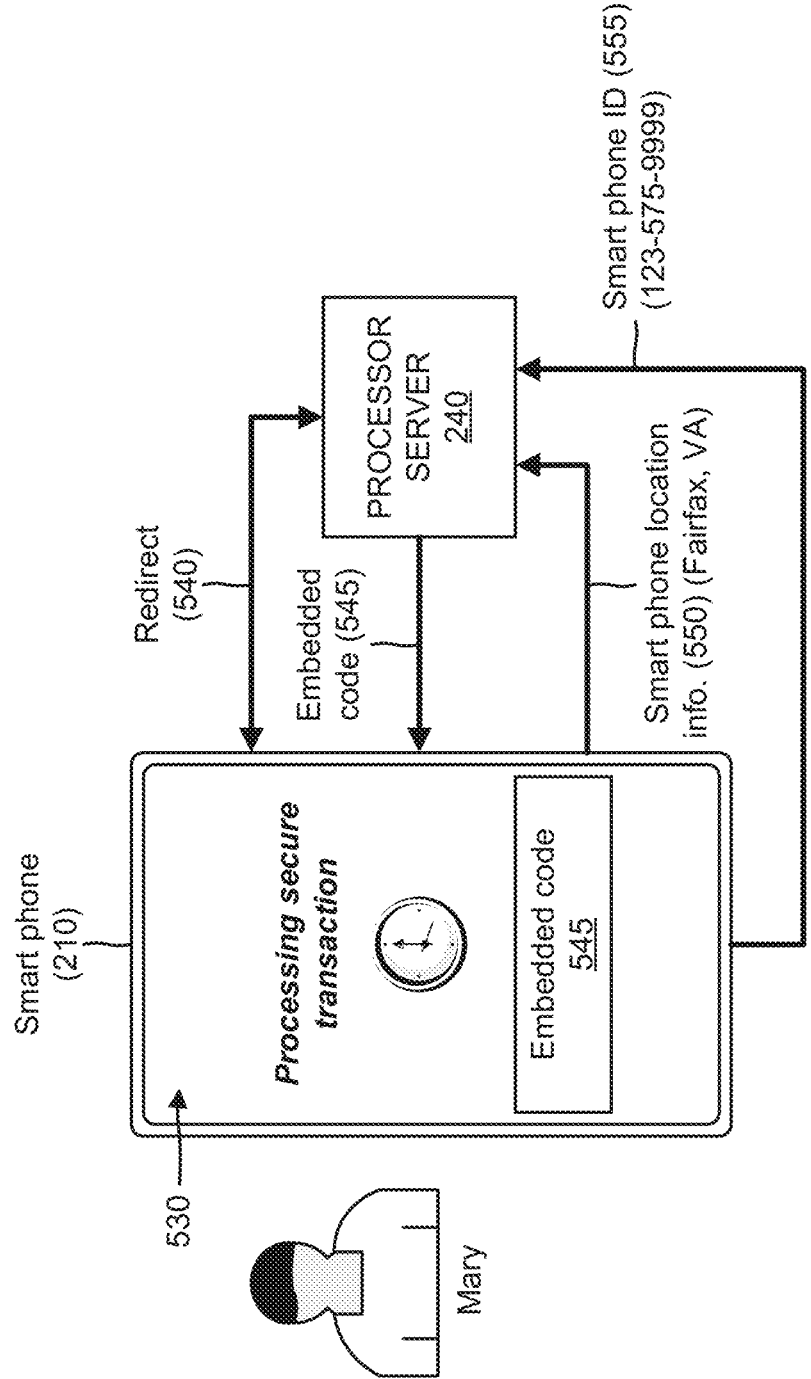

When processor server 240 receives secure transaction information 535, smart phone 210 may continue to display web page 530, and may be redirected to processor server 240 from payment gateway 230 (e.g., without Mary's knowledge), as indicated by reference number 540 in FIG. 5D. Processor server 240 may temporarily provide embedded code 545 to smart phone 210, and smart phone 210 or processor server 240 may execute embedded code 545. As further shown in FIG. 5D, execution of embedded code 545 may cause smart phone 210 to provide, to processor server 240, location information 550 (e.g., "Fairfax, Va.") of smart phone 210 and an identifier (ID) 555 (e.g., "123-575-9999") of smart phone 210.

Figure 5E:
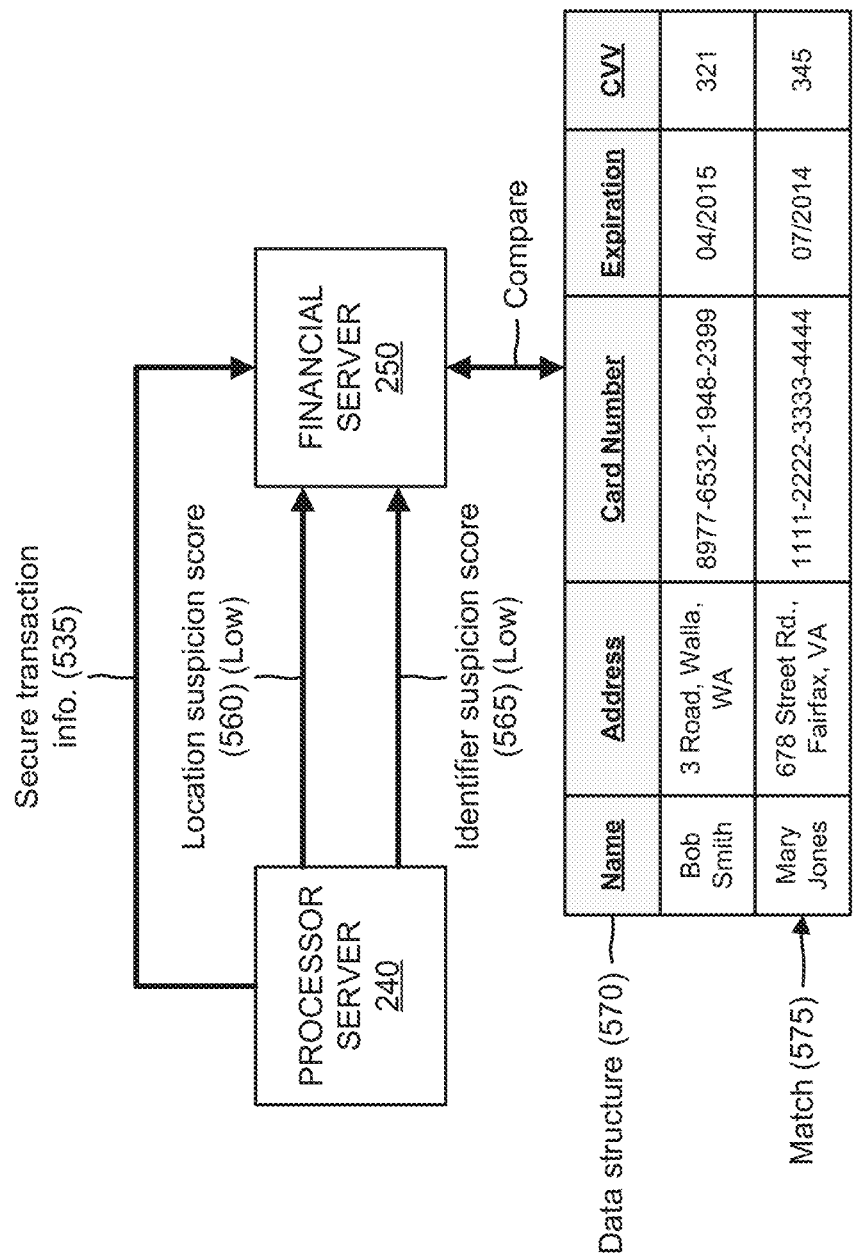

With reference to FIG. 5E, processor server 240 may determine a location suspicion score 560 for the transaction based on location information 550, and may determine an identifier suspicion score 565 for the transaction based on identifier 555. In example 500, assume that processor server 240 determines location suspicion score 560 to be a low value since Mary is located in Fairfax, Va. and Mary's billing address for the credit card is also in Fairfax, Va. Further, assume that processor server 240 determines identifier suspicion score 565 to be a low value since Mary has previously used smart phone 210 to make purchases with the credit card.

As shown in FIG. 5E, processor server 240 may provide secure transaction information 535, location suspicion score 560, and identifier suspicion score 565 to financial server 250. Financial server 250 may determine whether to approve or deny Mary's transaction based on secure transaction information 535, location suspicion score 560, and identifier suspicion score 565. In some implementations, financial server 250 may compare secure transaction information 535 with information provided in a data structure 570 associated with financial server 250. As shown in FIG. 5E, data structure 570 may include names, addresses, card numbers, expiration information, and CVVs for credit cards associated with financial server 250. Financial server 250 may also utilize location suspicion score 560 and identifier suspicion score 565 when determining whether to approve or deny Mary's transaction.

In example 500, assume that financial server 250 determines that secure transaction information 535 matches information provided in data structure 570, as indicated by reference number 575. For example, the name (e.g., "Mary Jones"), the address (e.g., "678 Street Rd., Fairfax, Va."), the card number (e.g., "1111-2222-3333-4444"), the expiration information (e.g., "07/2014"), and the CVV (e.g., "345") provided by Mary in secure transaction information 535 may match the second entry of data structure 570. Financial server 250 may also determine that the low values of location suspicion score 560 and identifier suspicion score 565 indicate that Mary's transaction is not suspicious.

Figure 5F:
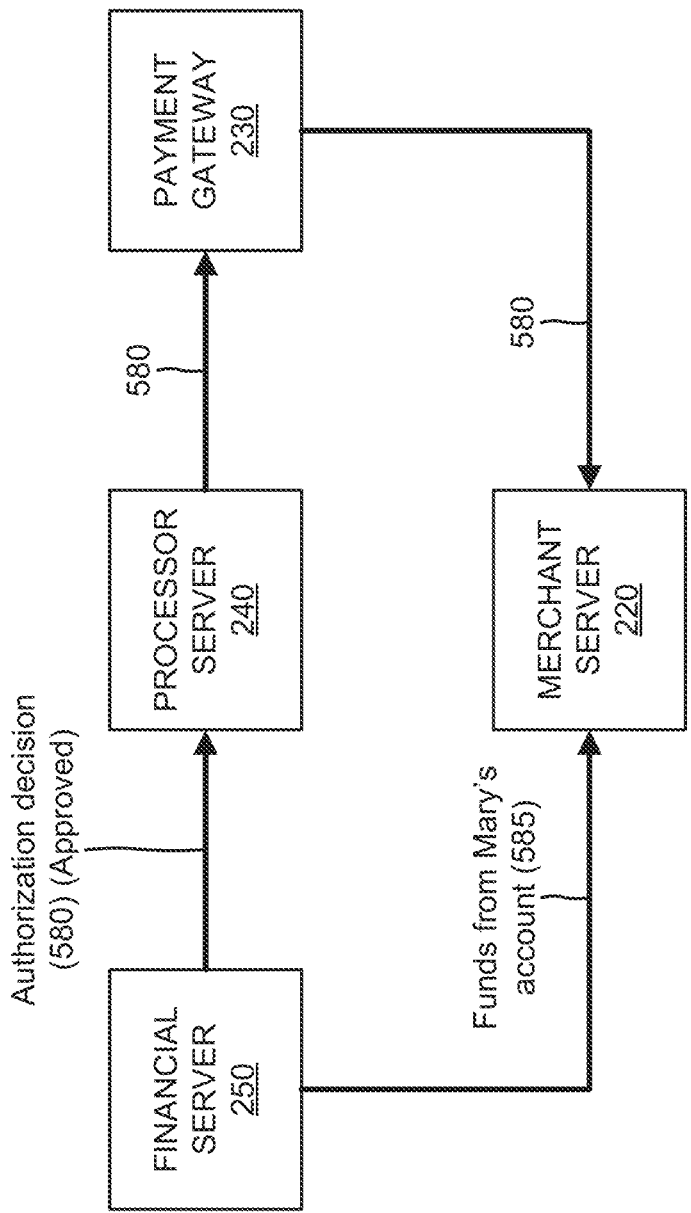

Based on these determinations, financial server 250 may approve Mary's transaction, and may generate an authorization decision 580 (e.g., indicating that Mary's transaction is approved), as shown in FIG. 5F. Financial server 250 may provide authorization decision 580 to processor server 240, and processor server 240 may forward authorization decision 580 to payment gateway 230. Payment gateway 230 may provide authorization decision 580 to merchant server 220. As further shown in FIG. 5F, financial server 250 may transfer funds 585 from Mary's account (e.g., established with the entity associated with financial server 250), to an account associated with merchant server 220 (e.g., at the merchant's bank).

Figure 5G:
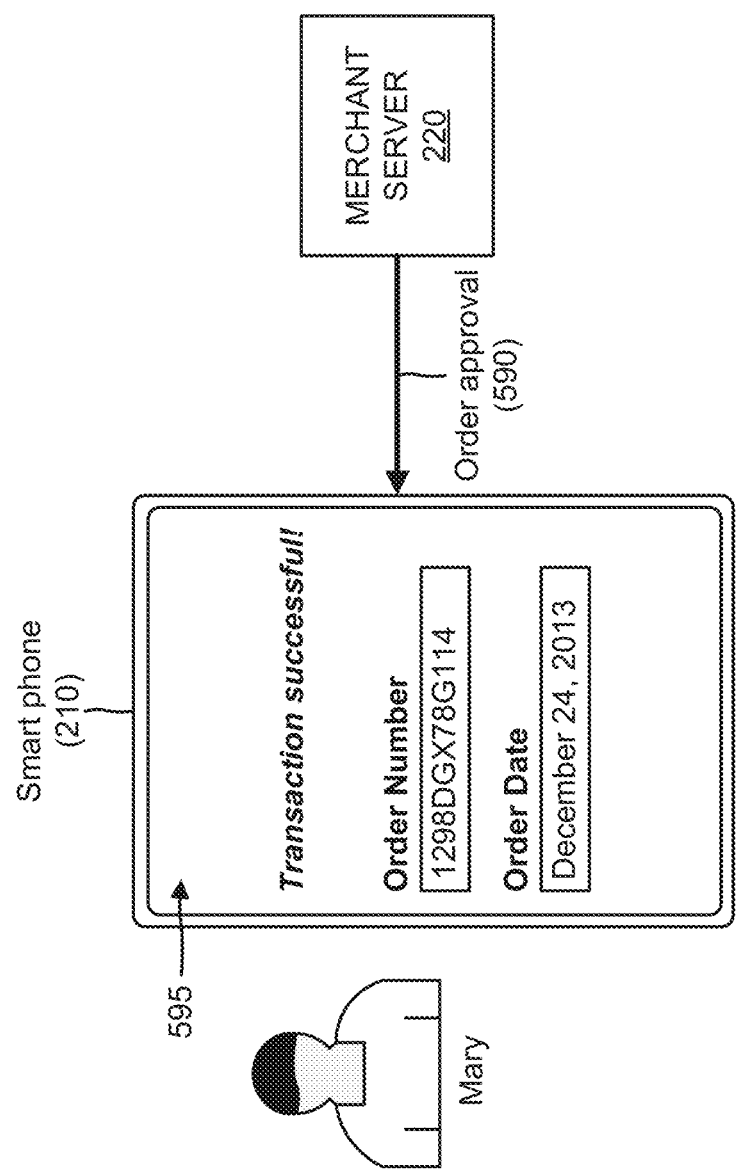

When merchant server 220 receives authorization decision 580, merchant server 220 may complete Mary's transaction by generating an order approval 590, and providing order approval 590 to smart phone 210, as shown in FIG. 5G. Smart phone 210 may display information associated with order approval 590 to Mary, as indicated by reference number 595. For example, smart phone 210 may display an order number (e.g., "1298DGX78G 114"), an order date (e.g., "Dec. 24, 2013"), an estimated date of delivery of the shoes and the skirt, a shipping method for the order, etc.

As indicated above, FIGS. 5A-5G are provided merely as an example. Other examples are possible and may differ from what was described with regard to FIGS. 5A-5G. In some implementations, the various operations described in connection with FIGS. 5A-5G may be performed automatically or at the request of the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code-it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
  receiving, by a first server device and via a network, transaction information associated with an online transaction between a user device and a merchant device, the first server device being different from the user device and the merchant device;
  establishing, by the first server device and via the network, a communication with the user device based on a network connection of the user device being redirected from the merchant device to the first server device;
  providing, by the first server device and via the network, embedded code to the user device temporarily based on receiving the transaction information and based on establishing the communication with the user device;
  receiving, by the first server device, from the user device via the network, and based on execution of the embedded code in the user device:
    an encrypted first location information identifying a geographic location at which the user device is located, and
    an encrypted identifier of the user device;
      the embedded code being removed from the user device after the encrypted first location information and the encrypted identifier are received;
  receiving, by the first server device, an encryption key from the user device;
  decrypting, by the first server device and based on receiving the encryption key, the encrypted first location information and the encrypted identifier to create a decrypted first location information and decrypted identifier;
  calculating, by the first server device, a location suspicion score for the online transaction based on comparing the decrypted first location information with second location information,
    the second location information identifying one or more previous geographic locations associated with the user device or a credit card of a user associated with the user device, and
    the location suspicion score relating to a degree to which the online transaction corresponds to a fraudulent online transaction based on the decrypted first location information;
  determining, by the first server device, whether the decrypted identifier matches a previously utilized identifier of a previously utilized user device that was previously utilized by the user to perform online transactions;
  calculating, by the first server device, an identifier suspicion score for the online transaction based on determining whether the decrypted identifier matches the previously utilized identifier,
the identifier suspicion score relating to another degree to which the online transaction corresponds to the fraudulent online transaction based on the decrypted identifier;
calculating, by the first server device, an overall suspicion score based on the location suspicion score and the identifier suspicion score;
providing, by the first server device and via the network, the overall suspicion score to a second server device;
receiving, by the first server device and from the second server device via the network, an authorization decision for the online transaction based on the transaction information and the overall suspicion score; and
forwarding, by the first server device and via the network, the authorization decision to the merchant device to permit the merchant device to approve or deny the online transaction.

2. The method of claim 1, where the transaction information includes one of:
information associated with the credit card of the user, or
information associated with a payment service provider account of the user.

3. The method of claim 1, where the second server device is a financial device;
where providing the overall suspicion score comprises:
providing the transaction information and the overall suspicion score to the financial device,
the authorization decision being generated by the financial device based on the transaction information and the overall suspicion score; and
where receiving the authorization decision includes:
receiving the authorization decision from the financial device.

4. A device, comprising:
one or more processors to:
receive, via a network, transaction information associated with an online transaction between a user device and a merchant device,
the device being different from the user device and the merchant device,
establish, via the network, a communication with the user device based on a network connection of the user device being redirected from the merchant device to the device,
provide, temporarily and via the network, embedded code to the user device based on receiving the transaction information and based on establishing the communication with the user device,
receive, from the user device, via the network, and based on execution of the embedded code in the user device:
an encrypted first location information identifying a geographic location at which the user device is located, and
an encrypted identifier of the user device,
the embedded code being removed from the user device after the encrypted first location information and the encrypted identifier are received;
receive an encryption key from the user device;
decrypt, based on receiving the encryption key, the encrypted first location information and the encrypted identifier to create a decrypted first location information and decrypted identifier;
compare the decrypted first location information with second location information,
the second location information identifying one or more previous geographic locations associated with the user device or a credit card of a user associated with the user device,
determine whether the decrypted identifier matches a previously utilized identifier of a previously utilized user device that was previously utilized by the user to perform online transactions;
calculate an overall suspicion score based on determining whether the decrypted identifier matches the previously utilized identifier and based on comparing the decrypted first location information with the second location information,
the overall suspicion score relating to a degree to which the online transaction corresponds to a fraudulent online transaction,
provide, via the network, the overall suspicion score to a server device,
receive, from the server device and via the network, an authorization decision for the online transaction based on the transaction information and the overall suspicion score; and
forward, via the network, the authorization decision to the merchant device to permit the merchant device to approve or deny the online transaction.

5. The device of claim 4, where the one or more processors are further to:
calculate a location suspicion score for the online transaction based on the decrypted first location information and the second location information,
the location suspicion score providing an indication of fraud associated with the online transaction based on the decrypted first location information, and
calculate an identifier suspicion score for the online transaction based on the decrypted identifier,
the identifier suspicion score providing another indication of fraud associated with the online transaction based on the decrypted identifier; and
where, when calculating the overall suspicion score, the one or more processors are to:
calculate the overall suspicion score based on the location suspicion score and the identifier suspicion score.

6. The device of claim 4, where the server device is a financial device;
where the one or more processors, when providing the overall suspicion score, are to:
provide the transaction information and the overall suspicion score to the financial device,
the authorization decision being generated by the financial device based on the transaction information and the overall suspicion score; and
where, when receiving the authorization decision, the one or more processors are to:
receive the authorization decision from the financial device.

7. The device of claim 5, where, when calculating the overall suspicion score, the one or more processors are further to:
calculate the overall suspicion score by adding the location suspicion score and the identifier suspicion score.

8. A non-transitory computer-readable medium for storing instructions, the instructions comprising:

one or more instructions that, when executed by one or more processors of one or more devices, cause the one or more processors to:
receive, via a network, transaction information associated with an online transaction between a user device and a merchant device,
the one or more devices being different from the user device and the merchant device;
establish, via the network, a communication with the user device based on a network connection of the user device being redirected from the merchant device to the one or more devices;
provide, via the network, embedded code to the user device temporarily based on receiving the transaction information and based on establishing the communication with the user device;
receive, from the user device, via the network, and based on execution of the embedded code in the user device:
an encrypted first location information identifying a geographic location at which the user device is located, and
an encrypted identifier of the user device,
the embedded code being removed from the user device after the encrypted first location information and the encrypted identifier are received;
receive an encryption key from the user device;
decrypt, based on receiving the encryption key, the encrypted first location information and the encrypted identifier to create a decrypted first location information and decrypted identifier;
compare the decrypted first location information with second location information,
the second location information identifying one or more previous geographic locations associated with the user device or a credit card of a user associated with the user device;
determine whether the decrypted identifier matches a previously utilized identifier of a previously utilized user device that was previously utilized by the user to perform online transactions;
calculate a suspicion score of fraudulent online activity based on determining whether the decrypted identifier matches the previously utilized identifier and based on comparing the decrypted first location information with the second location information;
provide, via the network, the suspicion score to a server device;
receive, from the server device and via the network, an authorization decision for the online transaction based on the transaction information and the suspicion score; and
forward, via the network, the authorization decision to the merchant device to permit the merchant device to approve or deny the online transaction.

9. The non-transitory computer-readable medium of claim 8, where the one or more instructions, when executed by the one or more processors, further cause the one or more processors to:
calculate a location suspicion score for the online transaction based on the decrypted first location information and the second location information,
the location suspicion score providing an indication of fraud associated with the online transaction based on the decrypted first location information,
calculate an identifier suspicion score for the online transaction based on the decrypted identifier,
the identifier suspicion score providing another indication of fraud associated with the online transaction based on the identifier; and
where the one or more instructions, that cause the one or more processors to calculate the suspicion score of fraudulent online activity, cause the one or more processors to:
calculate the suspicion score of fraudulent online activity based on the location suspicion score and the identifier suspicion score.

10. The non-transitory computer-readable medium of claim 9, where the server device is a financial device;
where the one or more instructions, that cause the one or more processors to provide the suspicion score, cause the one or more processors to:
provide the transaction information and the suspicion score to the financial device,
the authorization decision being generated by the financial device based on the transaction information and the suspicion score; and
where the one or more instructions, that cause the one or more processors to receive the authorization decision for the online transaction, cause the one or more processors to:
receive the authorization decision from the financial device.

11. The non-transitory computer-readable medium of claim 9, where the one or more instructions, that cause the one or more processors to calculate the suspicion score of fraudulent online activity, cause the one or more processors to:
calculate the suspicion score of fraudulent online activity by adding the location suspicion score and the identifier suspicion score.

12. The method of claim 1, where receiving the authorization decision for the online transaction comprises:
receiving a denial of the online transaction based on the overall suspicion score being greater than a threshold.

13. The method of claim 1, further comprising:
assigning a first weight to the location suspicion scored; and
assigning a second weight to the identifier suspicion score; and
where calculating the overall suspicion score comprises:
calculating the overall suspicion score based on the first weight and the second weight.

14. The method of claim 1, where providing the embedded code to the user device comprises:
providing the embedded code to the user device without approval of the user.

15. The method of claim 1, where the embedded code includes one of:
an application,
a code snippet,
a script, or
a widget.

16. The device of claim 4, where the decrypted first location information or the second location information includes one of:
a Global Positioning System (GPS) location,
a cell location, or
a latitude coordinate and a longitude coordinate.

17. The non-transitory computer-readable medium of claim 8, where the transaction information is encrypted, and where the one or more instructions, when executed by the one or more processors, further cause the one or more processors to:
decrypt the transaction information.

18. The method of claim 1, further comprising:
causing the user device to display information indicating that the online transaction is being securely processed.

19. The device of claim 4, where the network connection of the user device is re-directed to the merchant device based on authorization decision.

20. The non-transitory computer-readable medium of claim 8, where payment is provided from the server device to the merchant device based on the authorization decision.

* * * * *